US009399970B2

(12) United States Patent
Peters et al.

(10) Patent No.: US 9,399,970 B2
(45) Date of Patent: Jul. 26, 2016

(54) COMBINATION PRESSURE- AND VACUUM-BASED EVAP LEAK DETECTION METHOD

(71) Applicant: FORD GLOBAL TECHNOLOGIES, LLC, Dearborn, MI (US)

(72) Inventors: Mark W Peters, Wolverine Lake, MI (US); Robert Roy Jentz, Westland, MI (US); Aed M Dudar, Canton, MI (US); Dennis Seung-Man Yang, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 292 days.

(21) Appl. No.: 14/042,748

(22) Filed: Oct. 1, 2013

(65) Prior Publication Data

US 2015/0090006 A1 Apr. 2, 2015

(51) Int. Cl.
*G01M 3/00* (2006.01)
*F02M 25/08* (2006.01)
*F02D 29/02* (2006.01)

(52) U.S. Cl.
CPC ............ *F02M 25/0818* (2013.01); *F02D 29/02* (2013.01)

(58) Field of Classification Search
CPC ......... F17D 5/06; F23N 2025/04; F23N 5/18; F23N 5/24; F02M 25/0818
USPC ...................................................... 73/40.5 R
See application file for complete search history.

(56) References Cited

U.S. PATENT DOCUMENTS 5,010,761 A * 4/1991 Cohen ................... G01M 3/229 73/40.7
6,073,487 A * 6/2000 Dawson ............. F02M 25/0809 73/114.39
6,314,797 B1 * 11/2001 Dawson ............. F02M 25/0809 73/49.2
8,751,174 B2 * 6/2014 Koehler ............. F02M 25/0818 702/51
2009/0099795 A1 * 4/2009 Behar ................ F02M 25/0818 702/51
2014/0257721 A1 * 9/2014 Thompson ............ G01M 3/226 702/51

* cited by examiner

*Primary Examiner* — Eric S McCall
*Assistant Examiner* — Mohammed E Keramet-Amircola
(74) *Attorney, Agent, or Firm* — Joseph E. Root

(57) ABSTRACT

A method and system for conducting leak detection in an evaporative emission control system. The method performs a pressure-based leak test at selected intervals. The pressure-based test includes pressurizing the system, using a pump. Then, the system monitors pressure for a selected period. If system pressure falls below a threshold value during the selected period, the system identifies an initial leak. Upon identifying the initial leak, the system substitutes a vacuum-based leak test at each selected interval. The vacuum-based test includes evacuating the system, using the pump. The system then monitors system pressure for a selected period. If system pressure rises above a threshold value during the selected period, then the system identifies a subsequent leak. Upon receiving notification that the initial leak has been repaired, the system returns to pressure-based leak testing. Where a single pump is used, that pump is configured both for system pressurization and evacuation.

8 Claims, 4 Drawing Sheets

COMBINATION PRESSURE- AND VACUUM-BASED EVAP LEAK DETECTION METHOD

TECHNICAL FIELD

Embodiments of the present disclosure generally relate to Evaporative Emission Control Systems (EVAP) for automotive vehicles, and, more specifically, to detecting and repairing leaks within EVAP systems.

BACKGROUND

Gasoline, the fuel for many automotive vehicles, is a volatile liquid subject to potentially rapid evaporation, in response to diurnal variations in the ambient temperature. Thus, the fuel contained in automobile gas tanks presents a major source of potential emission of hydrocarbons into the atmosphere. Such emissions from vehicles are termed 'evaporative emissions' and those vapors can be emitted vapors even when the engine is not running In response to this problem, industry has incorporated evaporative emission control systems (EVAP) into automobiles, to prevent fuel vapor from being discharged into the atmosphere. EVAP systems include a canister (the carbon canister containing adsorbent carbon) that traps fuel vapor. Periodically, a purge cycle feeds the captured vapor to the intake manifold for combustion, thus reducing evaporative emissions.

Hybrid electric vehicles, including plug-in hybrid electric vehicles (HEV's or PHEV's), pose a particular problem for effectively controlling evaporative emissions. Although hybrid vehicles have been proposed and introduced in a number of forms, these designs all provide a combustion engine as backup to an electric motor. Primary power is provided by the electric motor, and careful attention to charging cycles can produce an operating profile in which the engine is only run for short periods. Systems in which the engine is only operated once or twice every few weeks are not uncommon. Purging the carbon canister can only occur when the engine is running, of course, and if the canister is not purged, the carbon pellets can become saturated, after which hydrocarbons will escape to the atmosphere, causing pollution.

EVAP systems are generally sealed to prevent the escape of any hydrocarbons. These systems require periodic leak detection tests to identify potential problems. Different system suppliers have adopted different testing methods, which can be generally classified as either vacuum-based or pressure-based techniques.

Vacuum-based techniques rely on evacuating the EVAP system and then monitoring to determine whether the system can hold the vacuum without bleed-up. This technique is known to produce false failures, unfortunately. More particularly, when the system is evacuated, air and vapor are removed, but once the system is resealed, the partial pressures of the fuel and vapor dome tend to equalize, resulting in a pressure rise. Usually, it is difficult to discern whether a bleed-up exists because of a leak or partial pressure equalization. Vacuum-based systems however, do not emit hydrocarbons into the atmosphere.

Pressure-based techniques are more reliable and less prone to false failures. In this procedure, when the system is pressurized, pressure conditions within the system mostly remain constant even when the pressure source is removed. Given the fact that the system is pressurized, however, this technique is susceptible to hydrocarbon release.

No EVAP leak detection system or method is currently available in the art that substantially minimizes release of hydrocarbons into the atmosphere, while also minimizing false failures during leak tests.

SUMMARY

One aspect of the present disclosure describes a method for conducting leak detection in an evaporative emission control system. The method begins by performing a pressure-based leak test at selected intervals. The pressure-based test includes pressurizing the system, using a pump. Then, the system monitors the pressure level for a selected period. If system pressure falls below a threshold value during the selected period, the system identifies an initial leak. Upon identifying the initial leak, the system substitutes a vacuum-based leak test at each selected interval. The vacuum-based test includes evacuating the system, using the pump. The system then monitors system pressure for a selected period. If system pressure rises above a threshold value during the selected period, then the system identifies a subsequent leak. Upon receiving notification that the initial leak has been repaired, the system returns to pressure-based leak testing.

Certain aspects of the present disclosure describe a leak detection unit in an evaporative emission control system, including an Evaporation Level Check Monitor (ELCM). The ELCM includes a pressure sensor, a reference orifice, and at least one pump. The pressure sensor is configured to detect pressure both within the ELCM and the evaporative emission control system. The reference orifice assists in determining a reference pressure value. Finally, the pump is configured both to pressurize the evaporative emission control system, and to evacuate the evaporative emission control system, as required by the evaporative emission control system.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure provides an efficient and reliable method for performing leaking test, and therefore, for detecting any leakage existing within the Evaporative Emission Control System (EVAP) of a plug-in hybrid electric vehicle )PHEV). The disclosed method substantially avoids the emission of hydrocarbons into the atmosphere, and also reduces the probability of any false failure generation during the leakage test. To this end, the method first relies on a pressure-based diagnostic technique to identify any leakage existing within the system, at an initial level. If a leak is detected, then the method switches to a vacuum-based testing to avoid hydrocarbon emissions, typically resulting from the pressure-based leak test. Vacuum remains the basis for further testing until the detected leak is repaired.

Exemplary Embodiments

The following detailed description illustrates aspects of the disclosure and its implementation. This description should not be understood as defining or limiting the scope of the present disclosure, however, such definition or limitation being solely contained in the claims appended hereto. Although the best mode of carrying out the invention has been disclosed, those in the art would recognize that other embodiments for carrying out or practicing the invention are also possible.

Figure 1A:
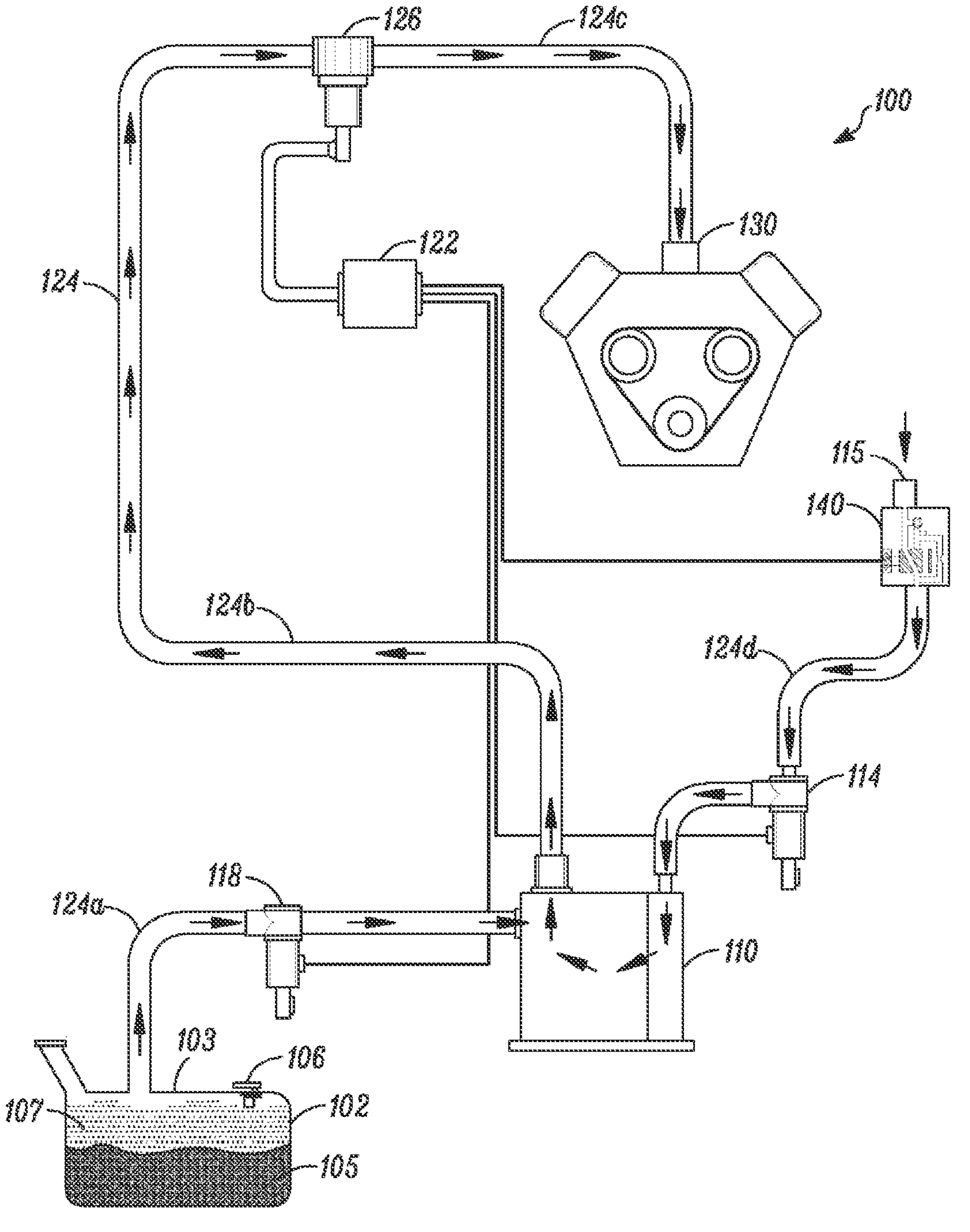
FIG. 1A is a schematic representation of a EVAP system for a vehicle, in accordance with the present disclosure.

FIG. 1A illustrates a conventional evaporative emissions control system 100. As seen there, the system 100 is made up primarily of the fuel tank 102, a carbon canister 110, and the engine intake manifold 130, all operably connected by flow lines and valves. It will be understood that many variations on this busy design are possible, but the illustrated embodiment follows the general practice of the art. It will be understood that the system 100 is generally sealed, with no open vent to atmosphere.

Fuel tank 102 is partially filled with liquid fuel 105, but a portion of the liquid evaporates over time, producing fuel vapor 107 in the upper portion (or "vapor dome 103") of the tank. The amount of vapor produced will depend upon a number of environmental variables, such as the ambient temperature. Of these factors, temperature is probably the most important, given the temperature variation produced in the typical diurnal temperature cycle. For vehicles in a sunny climate, particularly a hot, sunny climate, the heat produced by leaving a vehicle standing in direct sunlight can produce very high pressure within the vapor dome 103 of the tank 102. A fuel tank pressure transducer (FTPT) 106 monitors the pressure in the fuel tank vapor dome 103.

Vapor lines 124 operably join various components of the system. One line 124*a*, runs from the fuel tank 102 to carbon canister 110. A normally closed fuel tank isolation valve (FTIV) 118 regulates the flow of fuel vapors from fuel tank 102 to the carbon canister 110. Once the FTIV 118 is opened, fuel vapors can freely flow along the flow line 124*a*, from the fuel tank 10 towards the carbon canister 110, to facilitate adsorption of such fuel vapors by the carbon pellets contained within the canister 110. Vapor line 124*b* joins line 124*a* in a T intersection beyond FTIV 118, connecting that line with a normally closed canister purge valve (CPV) 126. Line 124*c* continues from CPV 126 to the engine intake manifold 130. CPV 126 is controlled by signals from the powertrain control module (PCM) 122, which also controls FTIV 118.

Canister 110 is connected to ambient atmosphere at vent 115, through a normally closed canister vent valve (CVV) 114. Vapor line 124*d* connects that valve to vent 115 in canister 110. PCM 122 controls CVV 114 as well.

PCM 122 may be configured to carry out additional tasks than generally known. Such tasks could include determining and storing tank pressure values, sending activation/deactivation and input/output signals to system components, monitoring pressure changes via a pressure sensor, time elapsed between check-ups, corresponding notifications, selecting intervals to perform leak checks, valve configurations, algorithms, and running routine EVAP leak detection procedures. Those in the art may contemplate these stored data benefitting other applications and/or diagnostics as well.

To this end, Powertrain Control Module (PCM 122) may include a controller (not shown) of a known type connected to the FTPT 106. Connections may extend to other sensors and devices as well, as shown. The controller may be of a known type, forming one part of the hardware of the automotive control system, and may be a microprocessor-based device that includes a central processing unit (CPU) for processing incoming signals from known sources. The controller may be provided with volatile memory units, such as a RAM and/or ROM that function along with associated input and output buses. Further, the controller may also be optionally configured as an application specific integrated circuit, or may be formed through other logic devices that are well known to the skilled in the art. More particularly, the controller may be formed either as a portion of an existing electronic controller, or may be configured as a stand-alone entity.

During normal operation, FTIV 118, CPV 126, and CVV 114 are all closed. When pressure within vapor dome 103 rises sufficiently, under the influence, for example, of increased ambient temperature, the PCM opens valve 118, allowing vapor to flow to the canister, where carbon pellets can adsorb fuel vapor.

To purge the canister 110, FTIV 118 is closed, and valves 126 and 114 are opened. It should be understood that this operation is only performed when the engine is running, which produces a vacuum at intake manifold 130. That vacuum causes an airflow from ambient atmosphere through vent 115, canister 110, and CPV 126, and then onward into intake manifold 130. As the airflow passes through canister 110, it entrains fuel vapor from the carbon pellets. The fuel vapor mixture then proceeds to the engine, where it is mixed with the primary fuel/air flow to the engine for combustion.

Evaporation Level Check Monitor (ELCM 140), is typically installed near the vent 115, and is operably connected to the PCM 122. Variations in that arrangement may be envisioned. ELCM 140 can be one of those units widely applied by OEMs to perform EVAP leak checks, such as the ELCM manufactured by Denso Corporation™. Other devices may however be substituted, as known to those in the art.

Figure 1B:
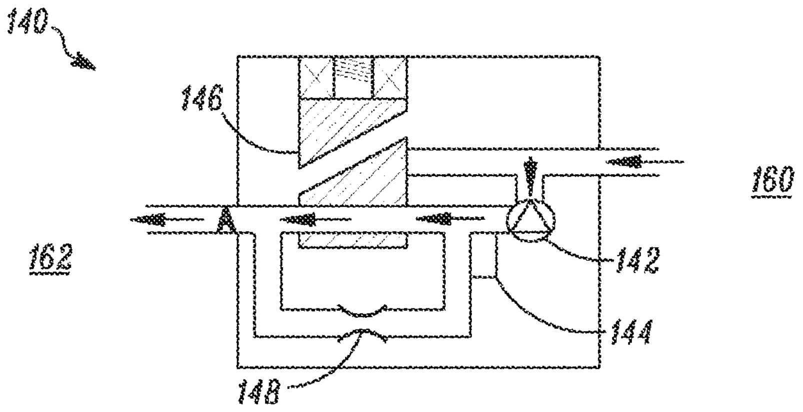
FIG. 1B is an enlarged ELCM's schematic representation.

An exemplary and enlarged ELCM layout is shown in FIG. 1B. The ELCM 140 includes a pump 142, to pressurize or depressurize the system 100; an absolute pressure sensor 144, to measure pressure conditions within the ELCM 140, and optionally, within the system 100; a Changeover Valve (COV 146), to alter fluid flow paths/directions; and a reference orifice 148, to determine reference/threshold pressure value.

Pump 142 may operate either to pressurize or evacuate the EVAP system during leak tests. This pump has fluid flow paths to both the EVAP system (160) and to ambient atmosphere (160), and it is controlled by PCM 122.

COV 146 is configured to provide at least three possible airflow paths, as selected by a solenoid (not shown). A connection to the PCM 122 generally facilitates solenoid activation, and thus, exploiting consequent valve switching provisions becomes possible. Reference orifice 148 permits the system to establish a threshold test value during each leak test. Those in the art are well aware of multiple COV configurations, as well as the use of the reference orifice, and, therefore, these elements will not be discussed further.

In general, EVAP leak detection techniques are either pressure-based or a vacuum-based. Most commonly, EVAP leak testing occurs routinely at or near the end of a drive cycle. The description below describes two of those testing methods.

Figure 2A:
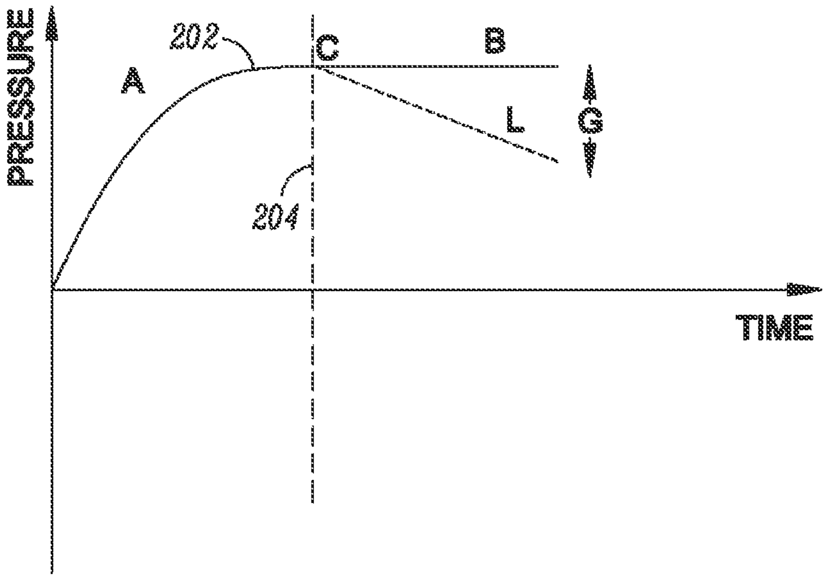
FIGS. 2A and 2B illustrate pressure variation within the EVAP system with respect to time, during an exemplary pressure-based and a vacuum-based leak detection test, respectively, according to an embodiment of the present disclosure.
Figure 2B:
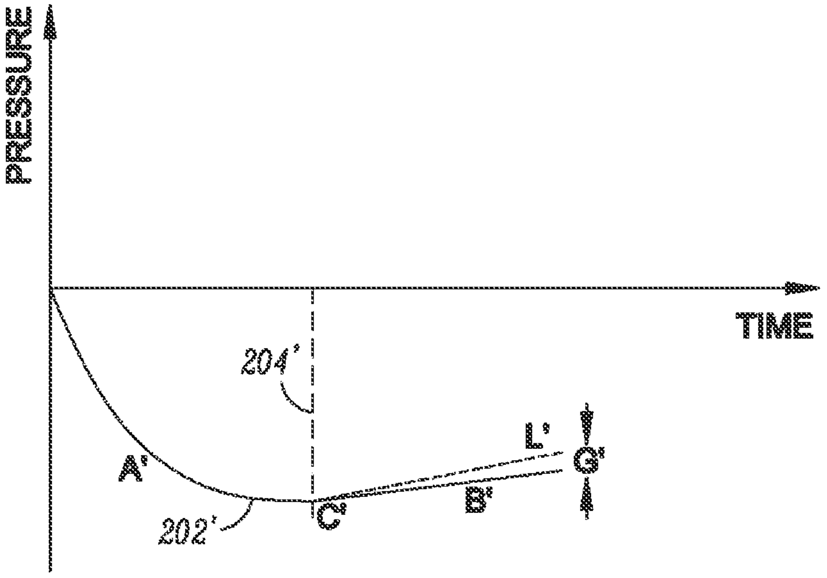

Turning to FIG. 2A and 2B, pressure and vacuum-based strategies are depicted via graphical representations. More particularly, curve 202 illustrates an exemplary pressure variation relative to time, for the pressure-based leak test, while curve 202' depicts a similar relation for a vacuum-based leak test. Both the representations depict pressure on the Y-axis and time on the X-axis.

During a pressure test (FIG. 2A), an operator pressurizes the system. That may be accomplished using the pump 142, though other pumps may be applied. Those in the art may contemplate several embodiments and/or variations to that configuration, and accordingly, in-vehicular pumps or pumps external to the system can find an application here. For example, service stations performing leak tests may be required to have a pumping unit set up outside the system. Another example may include a manufacturing plant based external pumping set-up.

During leak tests, pressure, depicted by curve 202, rises substantially, as shown in portion A. There, a slope greater than one is generally obtained. Pressure stabilizes, and at point C, n operator deactivates the pump. If the pressure holds steady at stabilization level B, then no leak is present. If a leak does exist, however, the pressure drops below a threshold value, as illustrated by line L.

A clearly discernible gap G exists between the leak line L and the stabilization curve B. That outcome benefits pressure-based testing applications, and, more particularly, it leads to more accurate test results. As noted, however, a disadvantage that accompanies this method is the substantially uncontrolled emission of hydrocarbons into the atmosphere.

Conversely, vacuum-based testing relies on lowering pressure within the system, rather than increasing it. Vacuum testing thereby attains a state of vacuum, and then monitors a change in negative pressure to gauge leaks. In this mode, pump 142 is configured as a vacuum pump, arranged to evacuate the system.

Referring to FIG. 2B, a vacuum-based leak test decreases system pressure, as shown by curve portion A'. represents that decrease. Here, however, gap G' between the steady-state vacuum level and the leak line L' is not as wide as that seen in the pressure-based system. Several reasons underlie that phenomenon. First, a leak here will change the partial pressure within the vapor dome, confusing the situation. Further, the pressure differential between a small leak and none at all is simply not very great in this situation. Thus, a vacuum-based leak test does not provide clear, unambiguous results, producing a number of false failures.

Curve variations may change depending upon given boundary conditions. Thus, the two graphical representations (FIGS. 2A and 2B) depicted here must be viewed as being purely exemplary.

Figure 3:
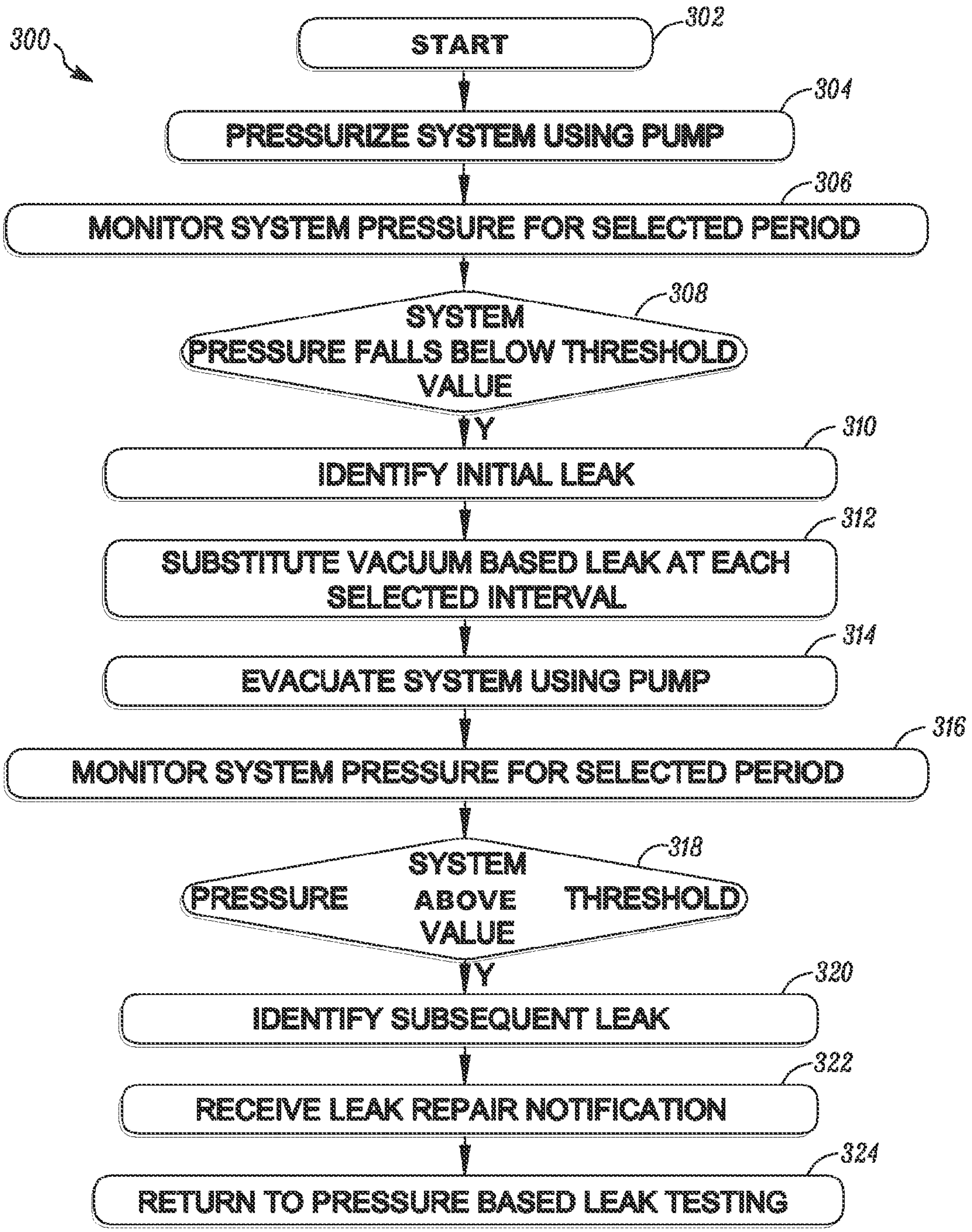
FIG. 3 is a flowchart illustrating an exemplary method to carry out an EVAP leak diagnosis in vehicles, according to the present disclosure.

To ease difficulties arising within the disclosed two leak detection methods, the present disclosure proposes to utilize both methods in a common leak testing procedure. Particularly, present disclosure exploits advantages offered by both strategies. Accordingly, a flowchart 300 is depicted, Thus FIG. 3, describes a method, that provides benefits of both leak testing strategies. At an initial step 302 it should be noted that leak testing is performed at intervals. Intervals can be chosen based on time (daily, weekly, etc.) or events (after key-off). Default intervals can be applied during manufacture or dealer preparation, or a technician many alter the test interval. Known techniques can be employed for that task.

The method begins by executing a pressure-based test. At step 304, pump 142 operates in pressure mode to pressurizes the system. As noted, this step may be performed by pump 142 or may be other device. At a following step 306, the PCM 122 monitors the pressure rise for a selected period. More particularly, pressure sensors (106, 144) disposed within the EVAP system facilitates that monitoring, and timer(s) installed within the PCM 122 enables time tracking At step 308 the sensor determines the system pressure and compares it to a threshold or reference value. If system pressure meets the reference value, then no leak is present. That result can be reported or stored, as desired, and the system goes dormant until the next interval is passed.

If however, the system detects that system pressure falls below a threshold or a reference value, the PCM 122 identifies a leak at a forthcoming step 310. Subsequent to identifying that initial or first leak, the PCM 122 immediately replaces the pressure-based leak identification technique with the vacuum-based testing, described in connection with FIG. 2B. That changeover needs to occur rapidly, to avoid emitting anymore hydrocarbons than is absolutely unavoidable. This action occurs at step 312. Accordingly, pump 142 reverses its operation mode and begins evacuating air and vapor from the system, at step 314. Completely reversing from overpressure to vacuum requires a bit of time, but the system reaches a stable vacuum condition relatively rapidly.

Alternatively, vacuum can be generated by employing the engine vacuum to evacuate the EVAP system. As is known, an automobile engine generates vacuum at the intake manifold. Also, the EVAP system has an existing connection to the intake manifold through the CPV 126 (FIG. 1). This vacuum could be employed to evacuate the system, by opening CPV 126, closing CVV 114, and opening FTIV 118. Vapor from the fuel tank 102 would be drawn into the engine and combusted, while the rest of the EVAP system would be subjected to vacuum. This method can be employed as an alternative to using vacuum pump 142 to evacuate the EVAP system.

At step 316, the pressure sensor senses and monitors the consequent fall in system pressure owing to evacuation. Because the sense of the test is reversed from the pressure-based technique, the question here is whether system pressure arrives at or stays at a sufficiently low value. Thus, step 318 determines whether the system pressure is above a threshold value. If not, then the leak test is successful in the system can await either the next interval or a notification that the leak identified by the pressure system has been repaired. In the former instance, expiration of the succeeding interval will reinitiate a test using the vacuum-based technique, while the repair notification will return the system to the pressure-based technique.

If system pressure remains above a reference or a threshold value during the period of leak testing, however, the PCM 122 identifies a leak at step 320. Particularly, determining leaks through the vacuum-based technique continues until the first leak is repaired. Once the first leak is repaired, additional controllers may output a leak repair notification at step 322. Having received that notification, the PCM 122 reverses the pump to return to the initial operation involving pressure-based leak testing, concluding a final step 324.

To avoid pump fatigue and wear, some embodiments may include induction of twin pumps into the evaporative emission control system. Here, each pump may be solely responsible for either pressurization or an evacuation operation.

Differing configurations of the system 100 may not restrict the disclosed ELCM's usability as through known mechanisms someone skilled in the art may form embodiments apart from what has been described. In effect, despite the system's customization and/or variation to any known extent, those skilled in art can ascertain ways to incorporate the disclosed method, described so far, into the EVAP system. Similarly, variations to the ELCM 240 may be contemplated.

The system 100 may be applied to a variety of other applications as well. For example, any similar application, requiring the adherence to stringent emission regulations may make use of the disclosed subject matter. Accordingly, it may be well understood by those in the art that the description of the present disclosure is applicable to a variety of other environments as well, and thus, the environment disclosed here must be viewed as being purely exemplary in nature.

Further, the system 100 discussed so far is not limited to the disclosed embodiments alone, as those skilled in the art may ascertain multiple embodiments, variations, and alterations, to what has been described. Accordingly, none of the embodiments disclosed herein need to be viewed as being strictly restricted to the structure, configuration, and arrangement alone. Moreover, certain components described in the application may function independently of each other as well, and thus none of the implementations needs to be seen as limiting in any way.

Accordingly, those skilled in the art will understand that variations in these embodiments will naturally occur in the course of embodying the subject matter of the disclosure in specific implementations and environments. It will further be understood that such variations will fall within the scope of the disclosure. Neither those possible variations nor the specific examples disclosed above are set out to limit the scope of the disclosure. Rather, the scope of claimed subject matter is defined solely by the claims set out below.

We claim:

1. A method for conducting leak detection in an evaporative emission control system, comprising:

performing a pressure-based leak test at selected intervals, including
  pressurizing the system, using a pump;
  monitoring the system pressure for a selected period;
  identifying an initial leak if system pressure falls below a threshold value during the selected period;

upon identifying the initial leak, substituting a vacuum-based leak test for the pressure-based leak test at each selected interval, including
  evacuating the system, using the pump;
  monitoring the system pressure for a selected period;
  identifying a subsequent leak if system pressure rises above a threshold value during the selected period; and upon receiving notification that the initial leak has been repaired, returning to pressure-based leak testing.

2. The method of claim wherein the leak testing is controlled by a Powertrain Control Module (PCM), the PCM having an integral system memory.

3. The method of claim wherein evacuating the system includes opening the canister purge valve to employ engine vacuum for evacuation.

4. The method of claim 1, wherein the pump is included in an Evaporation Level Check Monitor (ELCM), the ELCM having a pressure sensor to monitor the pressure within the evaporative emission control system.

5. The method of claim 4, wherein the ELCM includes an orifice for determining a reference pressure value.

6. A leak detection unit in an evaporative emission control system, including an Evaporation Level Check Monitor (ELCM), the ELCM comprising:

a pressure sensor configured to detect pressure within the ELCM and the evaporative emission control system;

a reference orifice for determining a first positive reference threshold pressure value, and a second negative reference pressure threshold value corresponding to evacuation and pressurization of the evaporative emission control system, respectively; and at least one pump configured both to pressurize the evaporative emission control system, and to evacuate the evaporative emission control system, as required by the evaporative emission control system;

a programmable control module coupled to the pressure sensor; wherein the leak detection unit is configured to:
  pressurize the evaporative emission control system, using the pump;
  monitor the pressure within the evaporative emission control system for a selected period after the system is pressurized; and
  identify an initial leak within the system if the system pressure falls below the first positive threshold pressure value; and upon identifying the initial leak, substituting a vacuum-based leak test for the pressure-based leak test at each selected interval, wherein the leak detection unit is configured to:
  evacuate the system, using the pump;
  monitor the system pressure for a selected period after the evacuation of the system; and
  identify a subsequent leak if system pressure rises above the second negative threshold pressure value.

7. The leak detection unit of claim 6, including at least two pumps, a first pump configured for pressurization and a second pump configured for evacuation of the evaporative emission control system.

8. The leak detection unit of claim 6, wherein the evaporative emission control system is controlled by a Powertrain Control Module (PCM), the PCM including a memory and a controller.

* * * * *